United States Patent
Musuluri

(10) Patent No.: US 10,960,312 B2
(45) Date of Patent: Mar. 30, 2021

(54) SYSTEM AND METHOD FOR CREATING DYNAMIC GAMES MAKING USE OF A SEARCH ENGINE

(71) Applicant: Aravind Musuluri, Johns Creek, GA (US)

(72) Inventor: Aravind Musuluri, Johns Creek, GA (US)

( * ) Notice: Subject to any disclaimer, the term of this patent is extended or adjusted under 35 U.S.C. 154(b) by 0 days.

(21) Appl. No.: 14/754,652

(22) Filed: Jun. 29, 2015

(65) Prior Publication Data

US 2015/0375119 A1    Dec. 31, 2015

Related U.S. Application Data

(60) Provisional application No. 62/018,326, filed on Jun. 27, 2014.

(51) Int. Cl.
  A63F 9/24      (2006.01)
  A63F 11/00     (2006.01)
  G06F 13/00     (2006.01)
  G06F 17/00     (2019.01)
  A63F 13/63     (2014.01)
  G06F 16/951    (2019.01)
  A63F 13/335    (2014.01)

(52) U.S. Cl.
  CPC .......... *A63F 13/63* (2014.09); *A63F 13/335* (2014.09); *G06F 16/951* (2019.01); *A63F 2300/8064* (2013.01)

(58) Field of Classification Search
  USPC ............... 463/9, 20, 22, 23, 29, 39, 40, 42; 434/335, 167
  See application file for complete search history.

(56) References Cited

U.S. PATENT DOCUMENTS

| | | | |
|---|---|---|---|
| 7,308,413 B1 * | 12/2007 | Tota .................. | G06F 21/10 705/7.11 |
| 10,282,453 B2 * | 5/2019 | Garg ................. | G06F 16/248 |
| 2006/0167874 A1 | 7/2006 | Von Ahn Arellano et al. | |
| 2007/0191108 A1 * | 8/2007 | Brunet De Courssou ............... | G07F 17/32 463/42 |
| 2008/0262925 A1 * | 10/2008 | Kim .................. | G06Q 30/02 705/14.27 |
| 2008/0293485 A1 * | 11/2008 | Moreno ............... | A63F 13/12 463/29 |
| 2010/0094814 A1 * | 4/2010 | Levy ................. | G06F 16/345 707/694 |
| 2010/0190145 A1 * | 7/2010 | Singer ................ | G09B 7/04 434/335 |
| 2010/0306154 A1 * | 12/2010 | Poray ................ | G06Q 30/02 706/47 |
| 2010/0317444 A1 * | 12/2010 | Chandrasekar ... | G06F 17/30864 463/43 |
| 2011/0246908 A1 * | 10/2011 | Akram ............ | H04N 21/234318 715/752 |
| 2011/0250940 A1 * | 10/2011 | Tsai .................. | A63F 13/85 463/9 |

(Continued)

*Primary Examiner* — Adetokunbo O Torimiro

(57) ABSTRACT

The present disclosure is a method of dynamic creation of games, the method comprising the steps of receiving keyword(s) from a user, performing a search operation comprising of the keyword(s) to generate a set of search result (s), selecting at least one search result and dynamically creating said game from the said search result.

18 Claims, 11 Drawing Sheets

(56) References Cited

U.S. PATENT DOCUMENTS

| | | | |
|---|---|---|---|
| 2011/0264494 A1* | 10/2011 | Lechowicz | G06Q 30/02 |
| | | | 705/14.12 |
| 2012/0108306 A1 | 5/2012 | Munsell et al. | |
| 2013/0149681 A1* | 6/2013 | Tinkler | G09B 7/04 |
| | | | 434/167 |
| 2013/0310153 A1* | 11/2013 | Goerlitz | G06Q 30/0209 |
| | | | 463/25 |
| 2014/0067474 A1* | 3/2014 | Deo | G06Q 30/0203 |
| | | | 705/7.32 |

\* cited by examiner

SYSTEM AND METHOD FOR CREATING DYNAMIC GAMES MAKING USE OF A SEARCH ENGINE

CROSS REFERENCE TO RELATED APPLICATION

This application claims priority to U.S. Provisional Application Ser. No. 62/018,326 entitled "System and Method for Creating Dynamic Online Games Making Use of a Search Engine" filed on Jun. 27, 2014, which is incorporated herein by reference.

TECHNICAL FIELD

The present disclosure generally relates to games. Particularly, the disclosure relates to creating games dynamically and more particularly to a system and method for creating dynamic games making use of a search engine.

BACKGROUND

The statements in this section merely provide background information related to the present disclosure and may not constitute prior art.

Search engines such as Google, Bing, and Yahoo Search are well known in the art and are used by users to find information on any topic. Such search engines instantly return relevant documents from vast data sources such as the Internet. In order to use a search engine, a user seeking information on a desired topic generally inputs a search query consisting of keyword(s) or phrase(s) relevant to the topic into the search interface of the search engine. In response, the search engine typically displays a report with a prioritized list of links pointing to relevant documents containing the search keywords. Oftentimes, a short summary of text i.e., extract/snippet is also included for each result. The extract/snippet is that portion or portions of the text in the document that contain the keywords from the search query.

A user may want to play games online for a variety of reasons. Some of the games that the user may play online may be question and answer games. The user is presented with a question and based on how close his answer is to the actual answer he/she may be awarded point(s). Such online games generally suffer from several drawbacks. The question/answers are composed manually and may not be available in the topic that the user may be interested in. Further, the question and answers may become stale within a short time and need to be manually updated constantly.

Thus, there is a need to create games dynamically that do not become stale and are not limited to few topics.

SUMMARY

The following presents a simplified summary of the disclosure in order to provide a basic understanding to the reader. This summary is not an extensive overview of the disclosure and it does not identify key/critical elements of the disclosure or delineate the scope of the disclosure. Its sole purpose is to present some concepts disclosed herein in a simplified form as a prelude to the more detailed description that is presented later.

According to the aspects illustrated herein, the present disclosure relates to a method to create dynamic games making use of a search engine.

According to the aspects related herein, the disclosure relates to a method of dynamic generation of games, the method comprising (a) receiving keyword(s) from a user (b) performing a search operation comprising of the keyword(s) to generate a set of search result(s) (c) selecting at least one search result (d) dynamically generating a game from the said search result.

The method of performing a search operation to generate a set of result(s) can be selected from any method commonly known in the art including any and future improvements thereof.

The type of game in accordance with the disclosure may be selected from the group comprising fill in the blanks, rearranging words, true/false and combinations thereof. In accordance with said exemplified games, the user may be presented with a question(s) or problem(s) to which the user may enter a response(s) which is compared against the answer(s) or solution(s) in the search result.

In one embodiment, the user may specify the type of game.

In another embodiment the game may be restricted to information contained in the visual elements of the search result document. Visual elements in accordance with the present disclosure may be selected from the group comprising paragraph, table, list, menu, fixed width text, key/value, graph/chart, question/answer, timeline, image and interactive data.

In one embodiment, the user may specify the visual element.

In one embodiment, the user may specify the level of difficulty of the questions.

In another embodiment, the question is framed in such a way that the answer is either a verb or a noun. In yet other embodiments, the answer may be other parts of speech.

In another embodiment, points may be awarded based on how close the user response is to the correct response.

In another embodiment, points may be awarded based on how close the user response is to the correct response as well as the level of difficulty of the game.

In another embodiment, there may be negative points for incorrectly answered questions.

In another embodiment, a timer may be used to measure the time taken by the user to provide a response. Points may depend on the speed of providing the response.

In another embodiment, points may be carried forward from one question to the next. In yet another embodiment, points may be carried forward from one session to the next.

In another embodiment, the questions may be dynamically classified based on the level of difficultly. The level of difficulty may be calculated based on the percentage of users who successfully answered the question in the past.

In one embodiment, the user may be presented one question at a time for the user to answer the question.

In another embodiment, the user may be presented more than one question at a time.

In yet another embodiment, the user may be presented with multiple questions for the same keyword(s).

In yet another embodiment, if the user has not specified keyword(s), random keyword(s) or any method may be used to generate search results.

In one embodiment, the search keyword(s) may be treated as context for the game.

In one embodiment, the user is presented with clues.

In another embodiment, the method further comprises maintaining a user history. In yet another embodiment, questions to a user may be based on the user history.

Particularly, the level of difficulty of questions may be based on level of difficulty of the question the user was successful in answering in the past.

In yet another embodiment, the user may provide feedback regarding the quality of questions and/or any errors which may be used to further enhance the game creation.

In another aspect of the present disclosure is provided with a system comprising game computing unit. The game computing unit may comprise one or more logics configured to perform the functions and operations associated with the above-disclosed methods.

In another aspect of the present disclosure is provided a computer program product executable in a memory of a game computing unit.

BRIEF DESCRIPTION OF THE DRAWINGS

The drawings described herein are for illustration purposes only and are not intended to limit the scope of the present disclosure in anyway. Throughout the disclosure, like elements are represented by like reference numerals, which are given by way of illustration only and thus are not limitative of the various embodiments.

Other objects and advantages of the present disclosure will become apparent to those skilled in the art upon reading the following detailed description of the preferred embodiments, in conjunction with the accompanying drawings, wherein.

DETAILED DESCRIPTION

Figure 1:
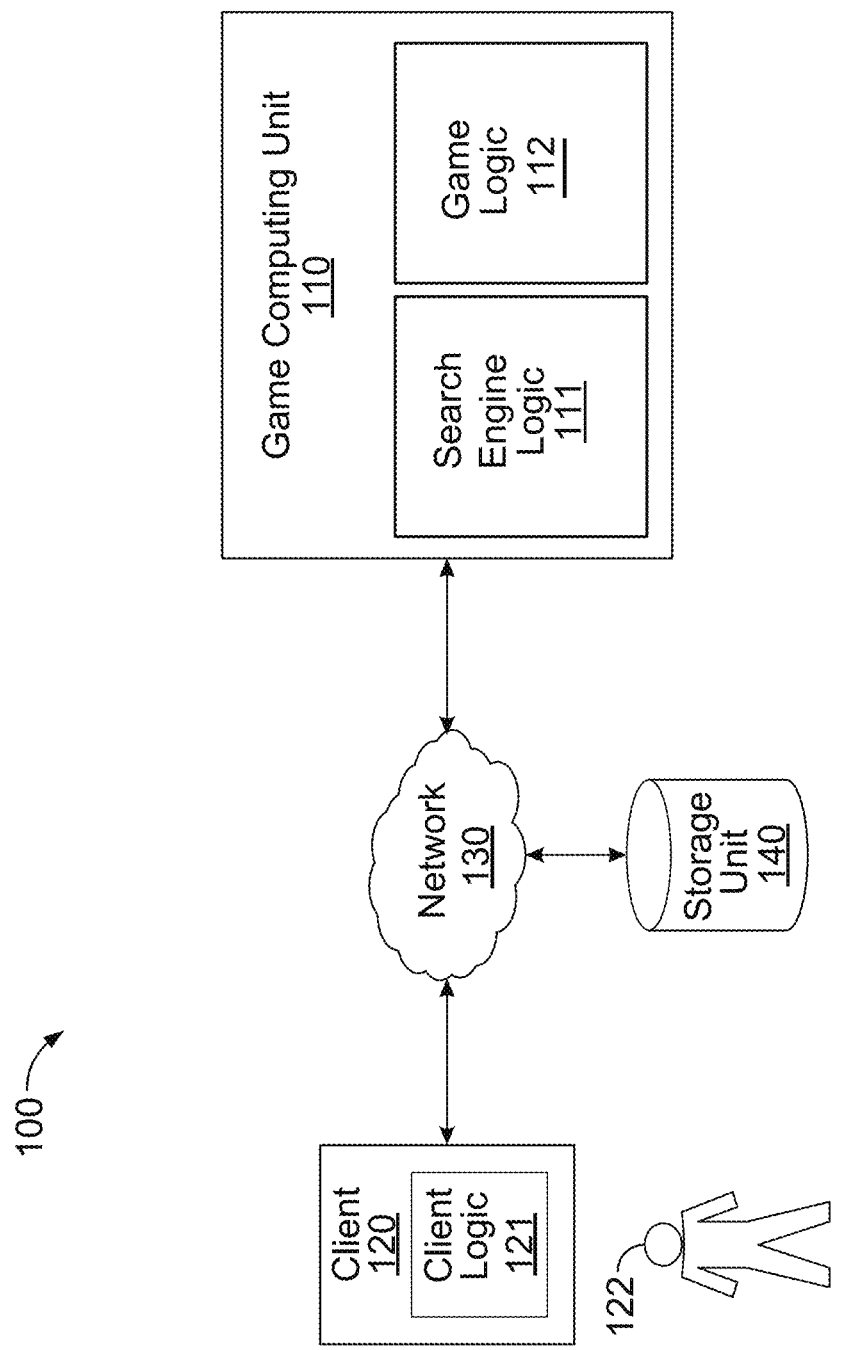
FIG. 1 is a block diagram illustrating an exemplary gaming environment in accordance with an embodiment of the present disclosure.

It is to be understood that the present disclosure is not limited in its application to the details of construction and the arrangement of components set forth in the following description or illustrated in the drawings. The present disclosure is capable of other embodiments and of being practiced or of being carried out in various ways. Also, it is to be understood that the phraseology and terminology used herein is for the purpose of description and should not be regarded as limiting.

The use of "including", "comprising" or "having" and variations thereof herein is meant to encompass the items listed thereafter and equivalents thereof as well as additional items. The terms "a" and "an" herein do not denote a limitation of quantity, but rather denote the presence of at least one of the referenced item. Further, the use of terms "first", "second", and "third", and the like, herein do not denote any order, quantity, or importance, but rather are used to distinguish one element from another.

The disclosure described here is equally applicable to any document containing text such as, but not limited to, HTML, DHTML, XML, SGML, PDF, E-mail, Microsoft® Word documents, Microsoft® Power point documents, news group postings, multimedia objects, Graphics Interchange Format images and/or Shockwave Flash files.

Through the length of the specification and claims, the words "question" and "problem" are used interchangeably.

Through the length of the specification and claims, the words "points", "score", "rewards" are used interchangeably.

FIG. 1 depicts a gaming environment 100 in accordance with an exemplary embodiment of the present disclosure. It will be understood and appreciated by those of ordinary skill in the art that the computing system architecture 100 shown in FIG. 1 is merely an example of one suitable computing system and is not intended to suggest any limitation as to the scope of use or functionality of the present invention. Neither should the computing system architecture 100 be interpreted as having any dependency or requirement related to any single module/component or combination of modules/components illustrated therein.

The system 100 comprises a game computing unit 110, a client 120 and a storage unit 140. The game computing unit 110, the client 120 and the storage unit 140 all communicate over a network 130.

The network 130 can include any type of network known in the art or future-developed. In this regard, the network 130 may be an Ethernet, a local area network (LAN), or a wide area network (WAN), e.g., the Internet, or a combination of networks.

The game computing unit 110 may be a dedicated or shared server including but not limited to any type of application server, database server, or file server and combinations thereof. The game computing unit 110 and the client 120 may include, but are not limited to, a computer, handheld unit, mobile unit, consumer electronic unit, or the like.

The exemplary game computing unit 110 comprises search engine logic 111 and game logic 112.

In the exemplary game computing unit 110, the search engine logic 111 may be configured to identify one or more documents that are relevant to search keywords. In one embodiment, the search engine logic 111 may classify and filter out documents with low quality scores i.e. documents with less reliable content.

The game computing unit 110 further comprises the game logic 112. The game logic 112 may be configured to dynamically create a game from a document.

The storage unit 140 is configured to store information associated with search results, user preferences, user scores, gaming history, or the like. In various embodiments, such information may include, without limitation, domains, URLs, webpages, websites, indexes, webpage quality scores, user personal details, past gaming history, information associated therewith, and the like. In embodiments, the storage unit 140 is configured to be searchable for one or more of the items stored in association therewith. It will be understood and appreciated by those of ordinary skill in the art that the information stored in association with the storage unit 140 may be configurable and may include any information relevant to search results, user preferences, user scores, gaming history or the like. The content and volume of such information are not intended to limit the scope of embodiments of the present disclosure in any way. Further, though illustrated as a single, independent component, the storage unit 140 may, in fact, be a plurality of storage units, for instance a database cluster, portions of which may reside on the game computing unit 110, the client 120, another external computing device (not shown), and/or any combination thereof. Moreover, the storage unit 140 may be included within the game computing unit 110 or client 120 as a computer-storage medium. The single unit depictions are meant for clarity, not to limit the scope of embodiments in any form.

A user 122 through the client logic 121 on the client 120 may enter a query consisting of keyword(s) which may identify the topic of the game that the user is interested in playing. The client logic 121 may comprise, for example, an Internet browser; however, other types of client logic 121 for interfacing with the user 122 and for communicating with the game computing unit 110 may be used in other embodiments of the present disclosure. The client logic 121 transmits the user query to the game computing unit 110 via the network 130. Upon receiving the user query the game logic 112 of the game computing unit 110 may delegate the query to the search engine logic 111 which in turn examines the storage unit 140 and returns to the game logic 112 one or more documents relevant to the query. The game logic 112 may then create question(s) dynamically based on the content from one or more documents identified by the search engine logic 111 and return the questions to the client logic 121 which may display the question(s) to the user 122 in a window.

In turn, the user 122 response(s) to the question(s) may then be transmitted to the game logic 112 by the client logic 121 which in turn evaluates the user response(s) by matching them with the answer(s) found in the original document and may awards points to the user 122 based on how close the response(s) are to the answer(s) found in the original document. The gaming logic is further explained with respect to FIGS. 3 through FIGS. 11.

Figure 2:
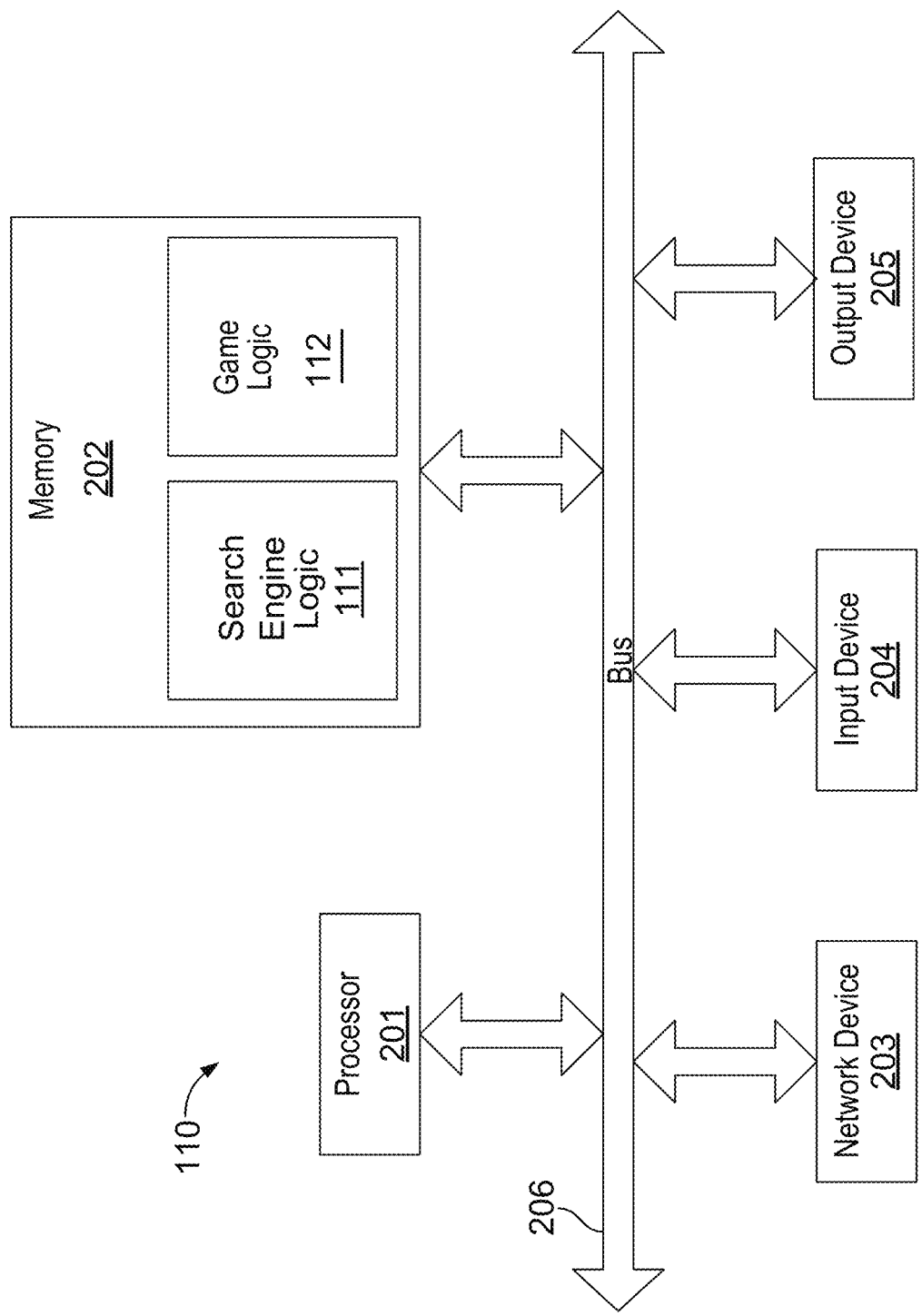
FIG. 2 is a block diagram of an exemplary gaming computing device of FIG. 1.

In some preferred embodiments, the game computing unit 110 is shown in FIG. 2. It should be noted, however, that embodiments are not limited to implementation on such computing devices, but may be implemented on any of a variety of different types of computing units within the scope of embodiments hereof. The game computing unit 110 (as shown in FIG. 1) is only one example of a suitable computing/search environment and it is not intended to suggest any limitation as to the scope of use or functionality of the disclosure.

In some embodiments, the game computing unit 110 may include a bus 206, a processor 201, memory 202, network device 203, input device 204, and an output device 205. Bus 206 may include a path that permits communication among the components of the game computing unit 110.

The processor 201 comprises processing hardware for interpreting or executing tasks or instructions stored in memory 202. Note that the processor 201 may be a microprocessor, a digital processor, or other type of circuitry configured to run and/or execute instructions.

The memory 202 may be any type of computer memory known in the art or future-developed for electronically storing data and/or logic, including volatile and non-volatile memory. In this regard, memory 202 can include random access memory (RAM), read-only memory (ROM), flash memory, any magnetic computer storage unit, including hard disks, floppy discs, or magnetic tapes, and optical discs.

The game computing unit 110 may store the search engine logic 111 and the game logic 112 as software in memory 202.

The network device 203 may be any type of network unit (e.g., a modem) known in the art or future-developed for communicating over a network 130 (FIG. 1). In this regard, the game computing unit 110 (FIG. 1) communicates with the storage unit 140 (FIG. 1) and the client 120 (FIG. 1) over the network 130 (FIG. 1) via the network device 203.

The input device 204 is any type of input unit known in the art or future-developed for receiving data. As an example, the input device 204 may be a keyboard, a mouse, a touch screen, a serial port, a scanner, a camera, or a microphone.

The output device 205 may be any type of output unit known in the art or future-developed for displaying or outputting data. As an example, the output device 205 may be a liquid crystal display (LCD) or other type of video display unit, a speaker, or a printer.

Note that the disclosure may also be practiced in a distributed computing environment where tasks or instructions of game computing unit 110 (FIG. 1) are performed by multiple computing units communicatively coupled to the network.

Further note that, the game computing unit 110 (FIG. 1) components may be implemented by software, hardware, firmware or any combination thereof. In the exemplary game computing unit 110, depicted by FIG. 1, all the components are implemented by software and stored in memory 202.

Figure 3:
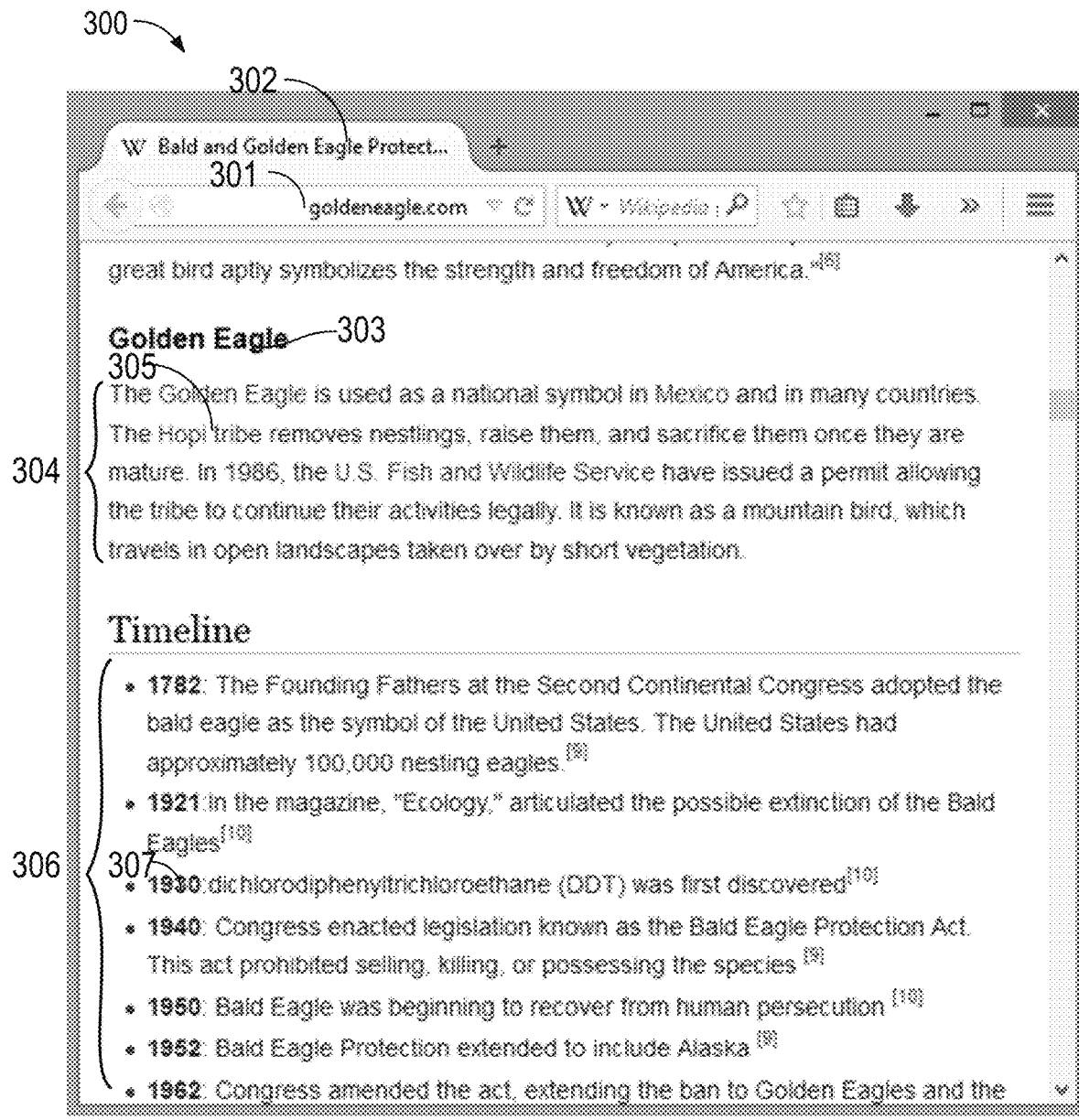
FIG. 3 illustrates an exemplary document.

FIG. 3 is a diagram illustrating a portion of a document 300 identified by the URL 301.

Figure 4:
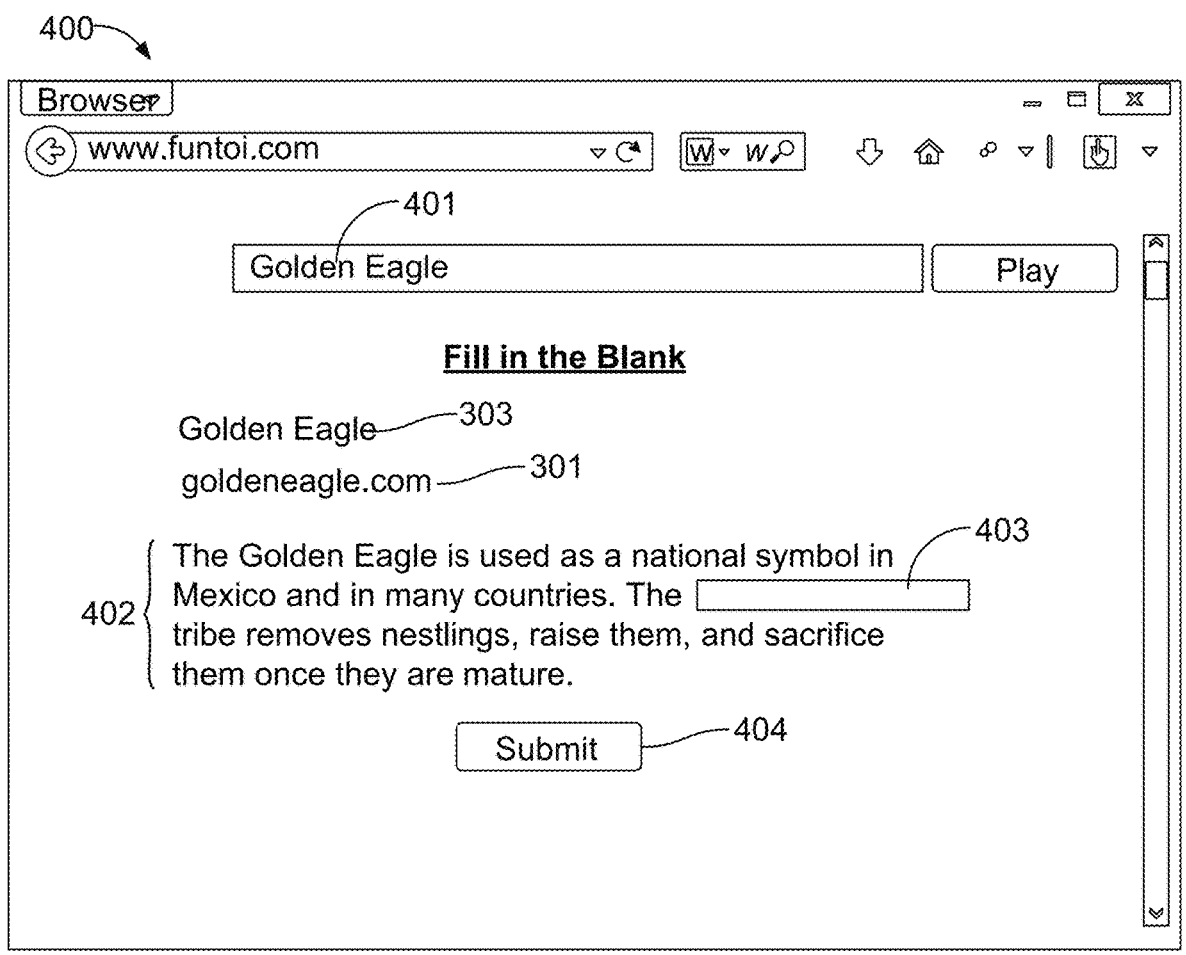
FIG. 4 illustrates an exemplary fill in the blank question presented to the user by the gaming computing device of FIG. 1.

FIG. 4 depicts an exemplary game page 400 comprising of a fill in the blank question in accordance with an embodiment of the present disclosure. Assume that the search engine logic 111 (FIG. 1) identified document 300 as a search result in response to the user search keywords 401. The game logic 112 (FIG. 1) dynamically creates the question 402 by removing word 305 (FIG. 3) from the section 304 (FIG. 3) of the document 300 (FIG. 3). To score points, the user has to fill in the missing word in the input box 403 and submit the response by selecting the control 404. Once the user fills in the input box 403 and submits the response, the game logic 112 (FIG. 1) compares the user's response with the text 305 (FIG. 3) from the section 304 (FIG. 3) of the document 300 (FIG. 3) and determines if the user response is correct or not and may award points to the user.

Note that the game logic 112 (FIG. 1) generated the question 402 by identifying nouns in the section 303 (FIG. 3) through Natural Language Processing and removing the noun 304 (FIG. 3).

The identifier of the document 301 (FIG. 3) and the title 303 (FIG. 3) of the section 304 (FIG. 3) may be included on the game page in one embodiment of the present disclosure.

Figure 5:
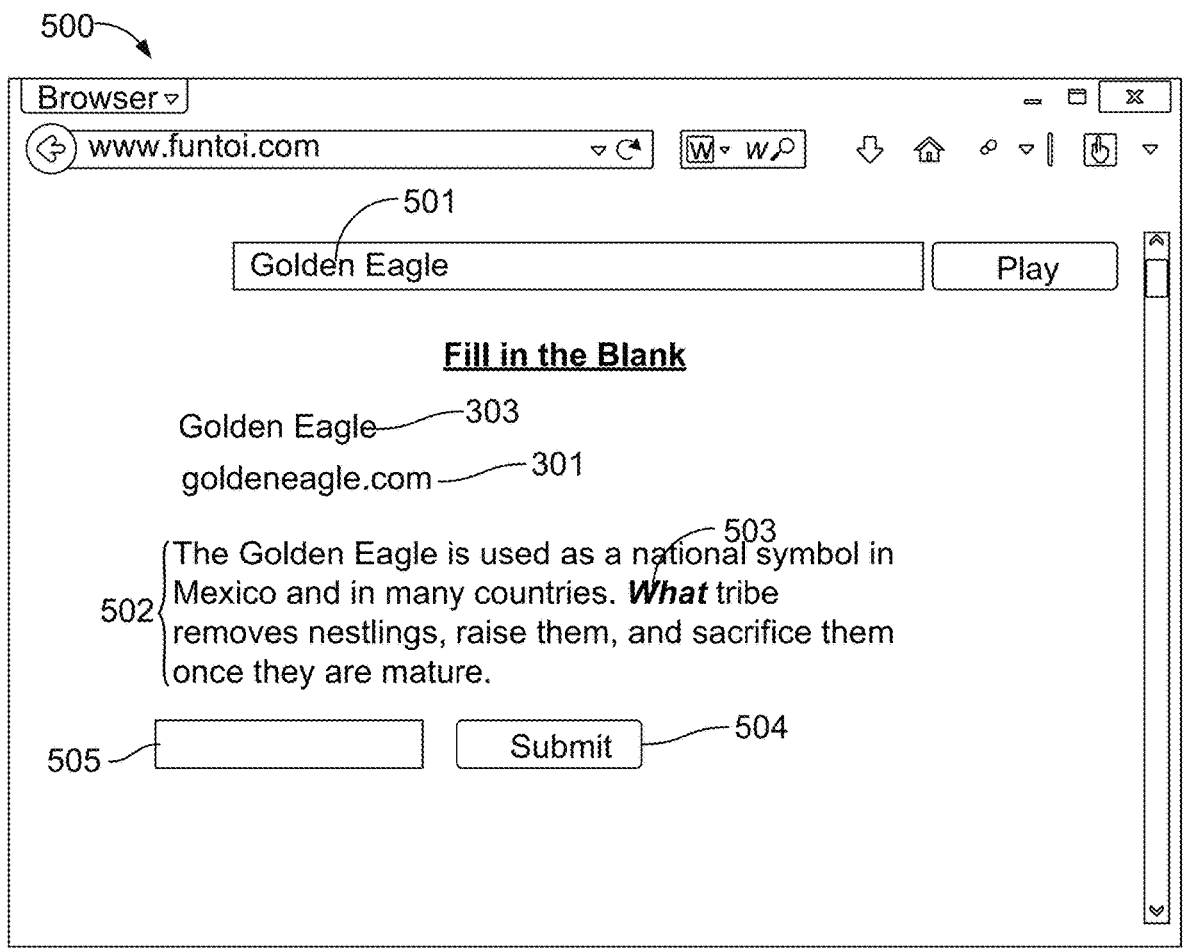
FIG. 5 illustrates another exemplary fill in the blank question presented to the user by the gaming computing device of FIG. 1.

FIG. 5 depicts another game page 500 with the same fill in the blank question 402 (FIG. 4) but in a different format 502. Here, the missing words are replaced by a question tag and the user may provide his response through the input box 505.

Figure 6:
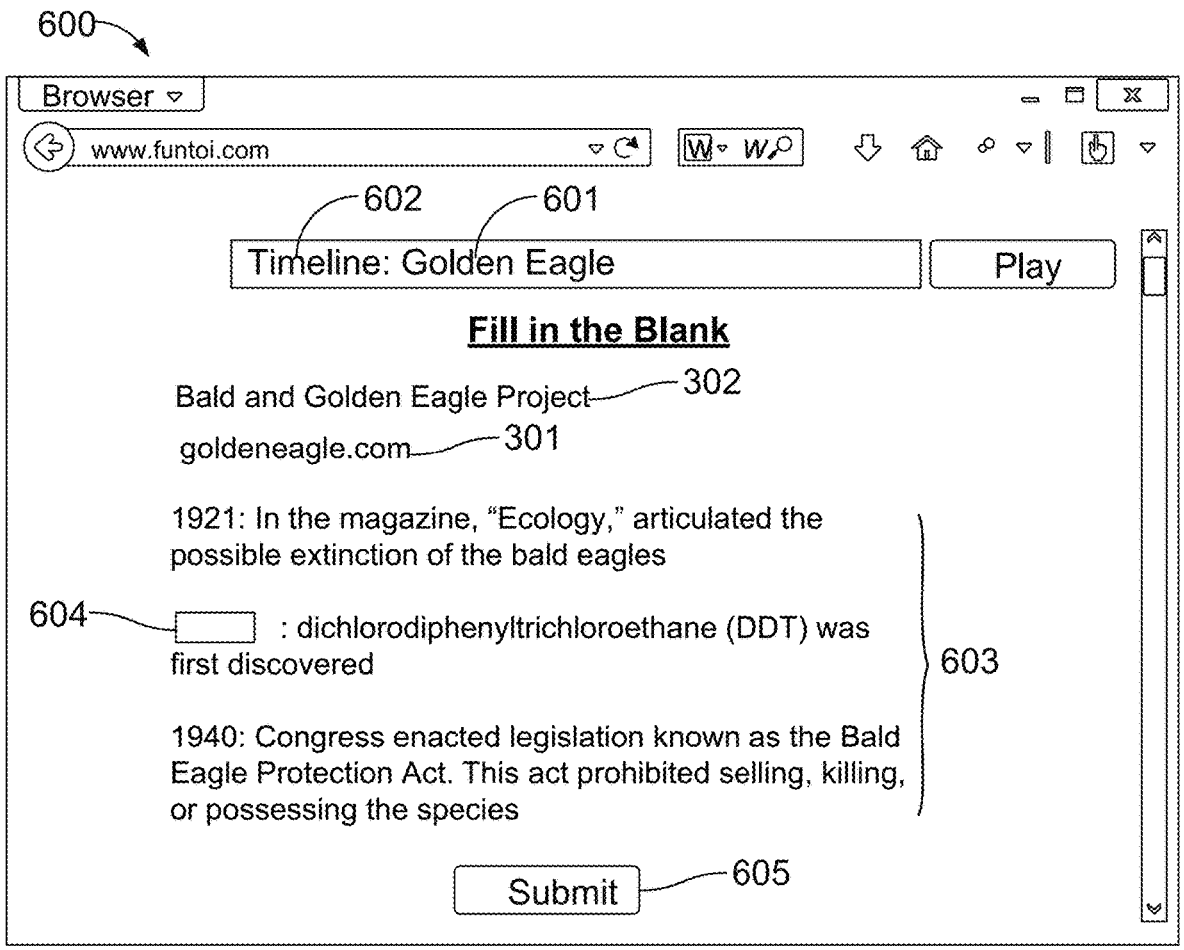
FIG. 6 illustrates another exemplary fill in the blank question selected from a timeline visual element and presented to the user by the gaming computing device of FIG. 1.

FIG. 6 depicts an exemplary game page 600 comprising of a fill in the blank question in accordance with an embodiment of the present disclosure. Assume that the search engine logic 111 (FIG. 1) identified timeline 306 (FIG. 3) in response to the user search keywords 601 and the user specified visual element "Timeline" 602. The game logic 112 (FIG. 1) dynamically creates the question 603 by removing the year 307 (FIG. 3) from the timeline 306. To score points, the user has to fill in the missing year in the input box 604 and submit the response to the game logic 112 (FIG. 1) by selecting control 605. Once the user fills in the input box 604 and submits the response, the game logic 112 (FIG. 1) compares the user's response with the text 307 (FIG. 3) from the timeline 306 (FIG. 3) and determines if the user response is correct or not and may award points to the user.

Figure 7:
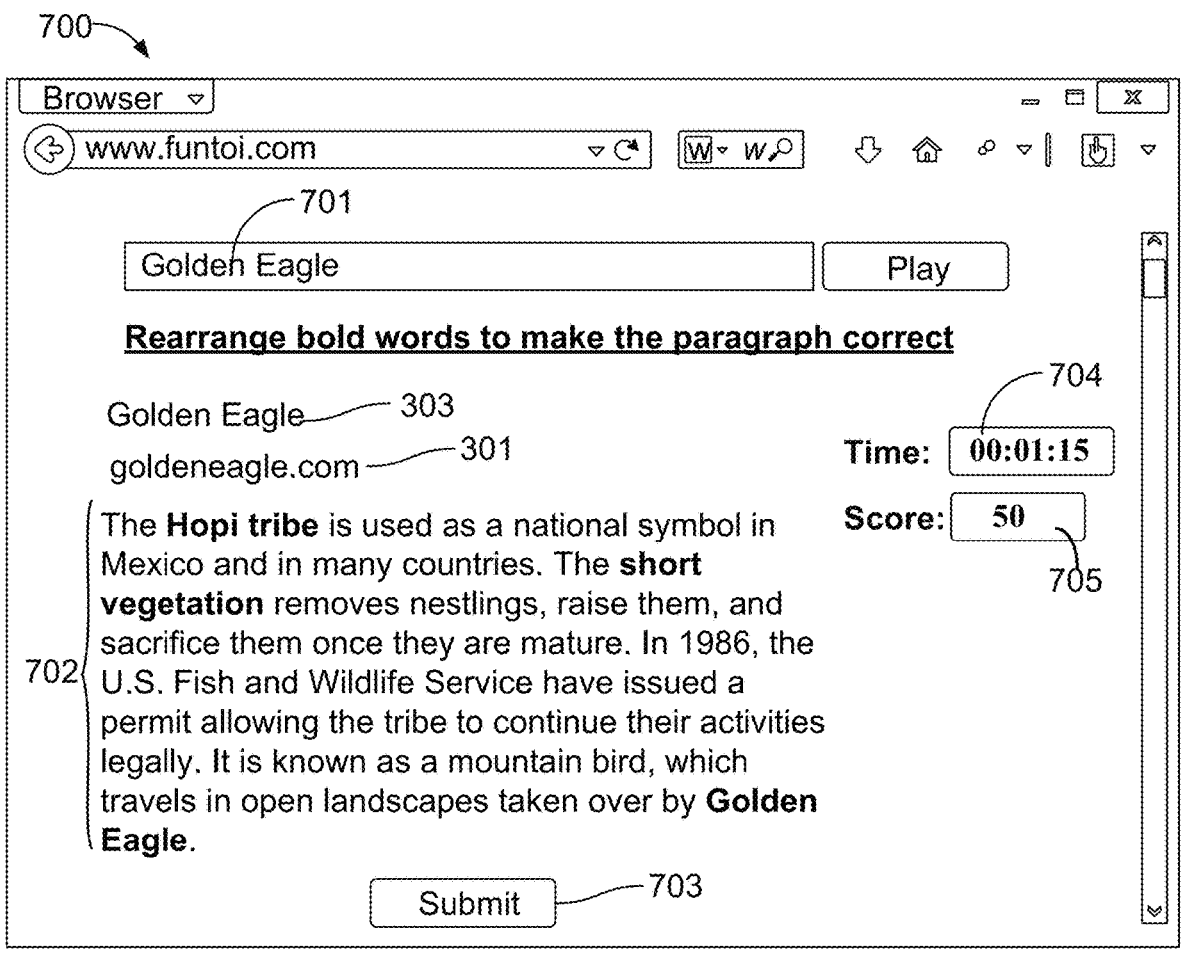
FIG. 7 illustrates an exemplary rearranging words question presented to the user by the gaming computing device of FIG. 1.

FIG. 7 depicts an exemplary game page 700 comprising of a rearranging words question in accordance with an embodiment of the present disclosure. Assume that the search engine logic 111 (FIG. 1) identified document 300 (FIG. 3) in response to the user search keywords 701. The game logic 112 (FIG. 1) dynamically creates the question 702 by rearranging word(s) in the section 304 (FIG. 3) of the document 300 (FIG. 3) from the content. To score points, the user has to rearrange the words in such a way that they match the order in the original document 300 (FIG. 3). The game logic 112 (FIG. 1) may provide clues to the user out of order words in the question 702 by presenting the words which are out of order in a different presentation semantics from the question 702. After rearranging the word(s) the user may submit the response by selecting the control 703. Once the user submits the response, the game logic 112 (FIG. 1) compares the user's response with the text from the section 304 (FIG. 3) and determines if the user response is correct or not and may award points to the user.

Note that in other embodiments, the clues may be, but not limited to, answer among a group of choices, scrambled answers etc., The game page 700 further comprises of a time control 704. In the exemplary embodiment, the time control 704 indicates to the user the amount of time left for him to answer the question 702.

In other embodiments, a time control may be used to measure the speed of user response and points awarded based on the speed of the response.

The game page 700 further comprises a score control 705. In the exemplary embodiment, the score control 705 maintains a running total of points earned by the user for all the questions in the game session.

Figure 8:
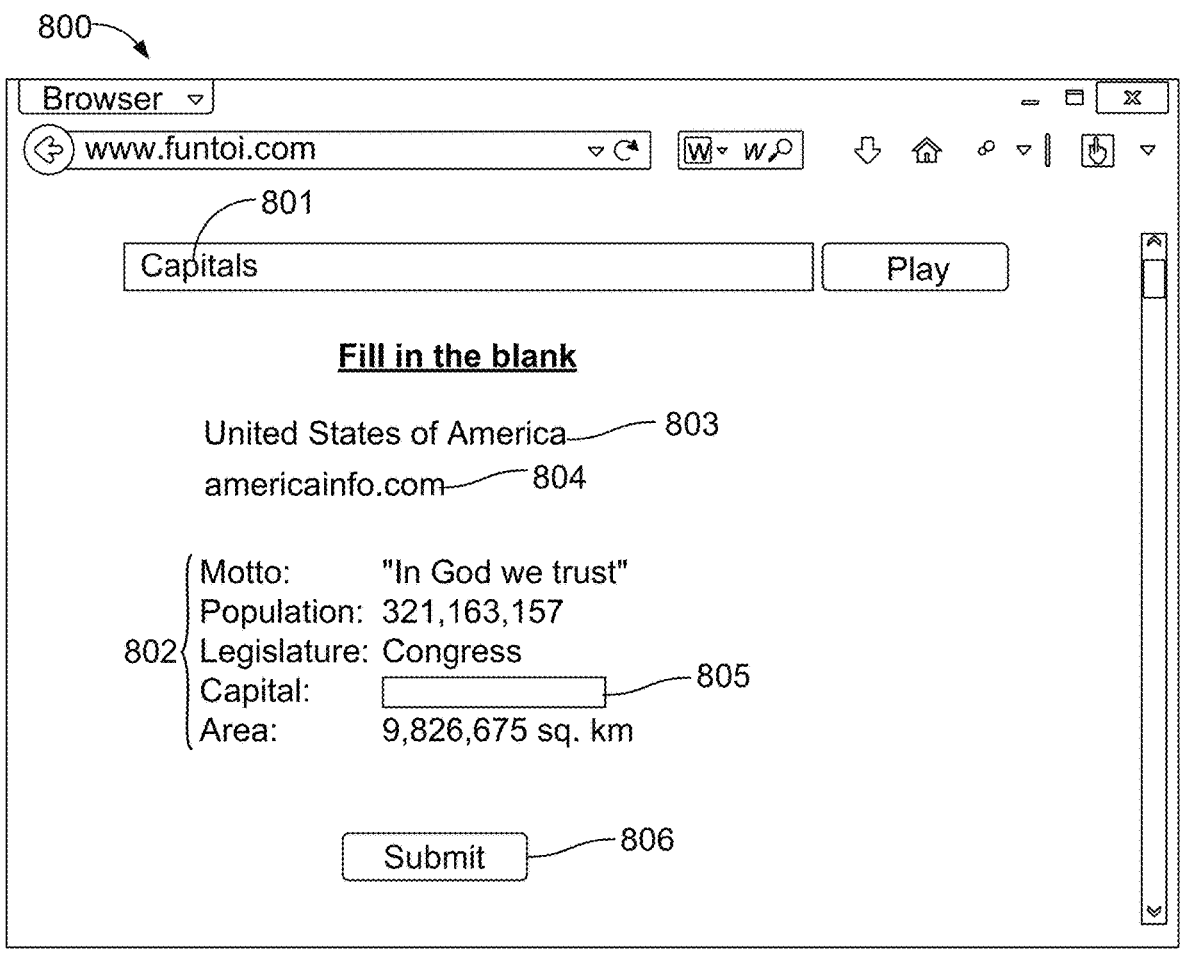
FIG. 8 illustrates another exemplary fill in the blank question presented to the user by the gaming computing device of FIG. 1.

FIG. 8 depicts an exemplary game page 800 comprising of a fill in the blank question in accordance with an embodiment of the present disclosure. The search engine logic 111 (FIG. 1) identifies documents that are relevant to the user search keyword 801. The game logic 112 (FIG. 1) dynamically creates the question 802 from a document (not shown) identified by the search engine logic 111 (FIG. 1). The game logic 112 (FIG. 1) further creates the game in such a way that the user response is related to the search keyword 801. The game logic 112 (FIG. 1) treats the search keywords as context for the game. To score points, the user has to fill in the missing capital value in the input box 805 and submit the response to the game logic 112 (FIG. 1) by selecting control 806. Once the user fills in the input box 805 and submits the response, the game logic 112 (FIG. 1) compares the user's response with the answer in the document (not shown) and determines if the user response is correct or not and may award points to the user.

In one embodiment, all the search keyword(s) are assumed to provide context for the dynamically created game. In yet another embodiment, a user may specify which search keyword(s) provide context for the dynamically created game.

Figure 9:
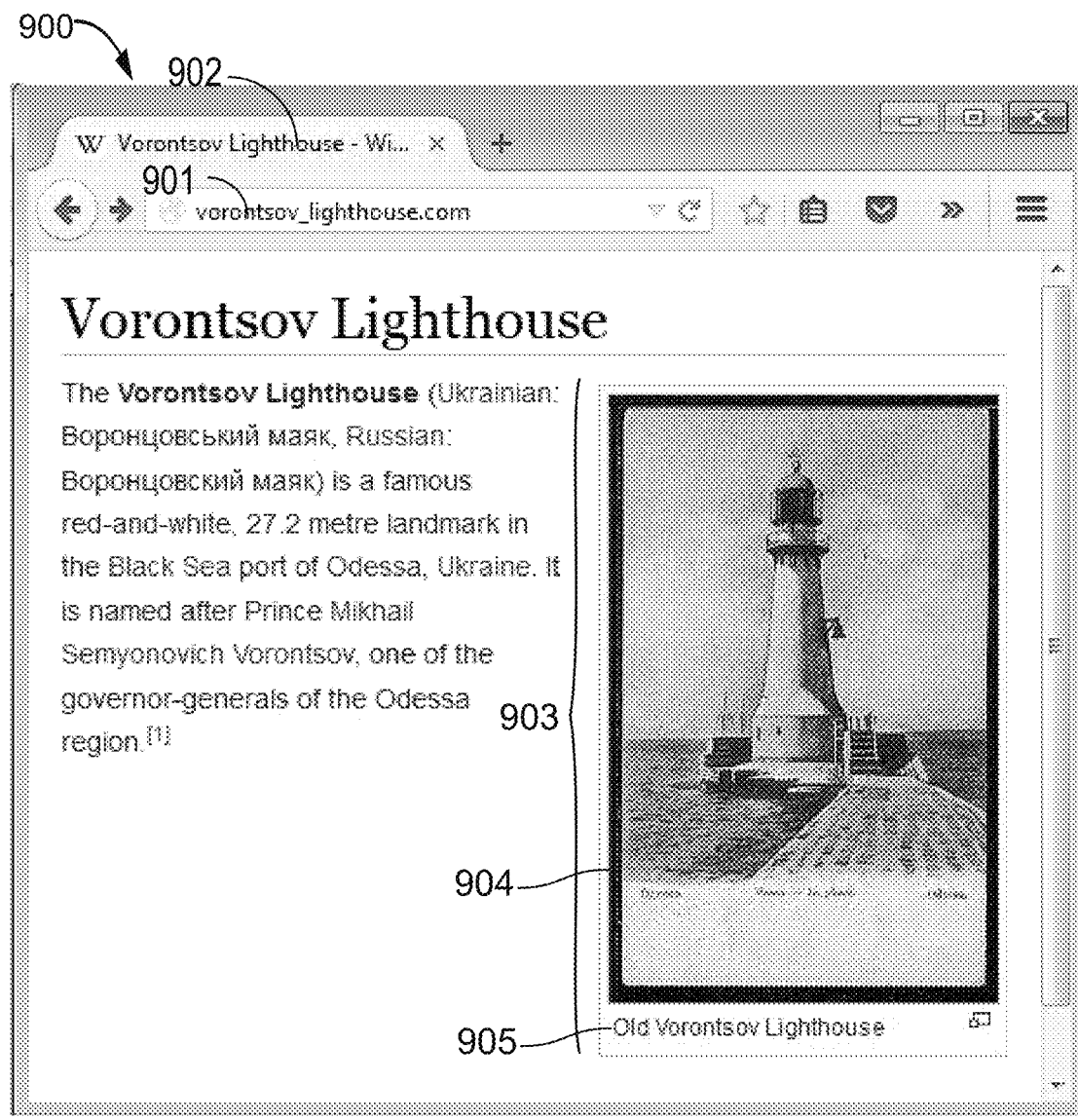
FIG. 9 illustrates an exemplary document.

FIG. 9 is a diagram illustrating a portion of a document 900 identified by the URL 901.

Figure 10:
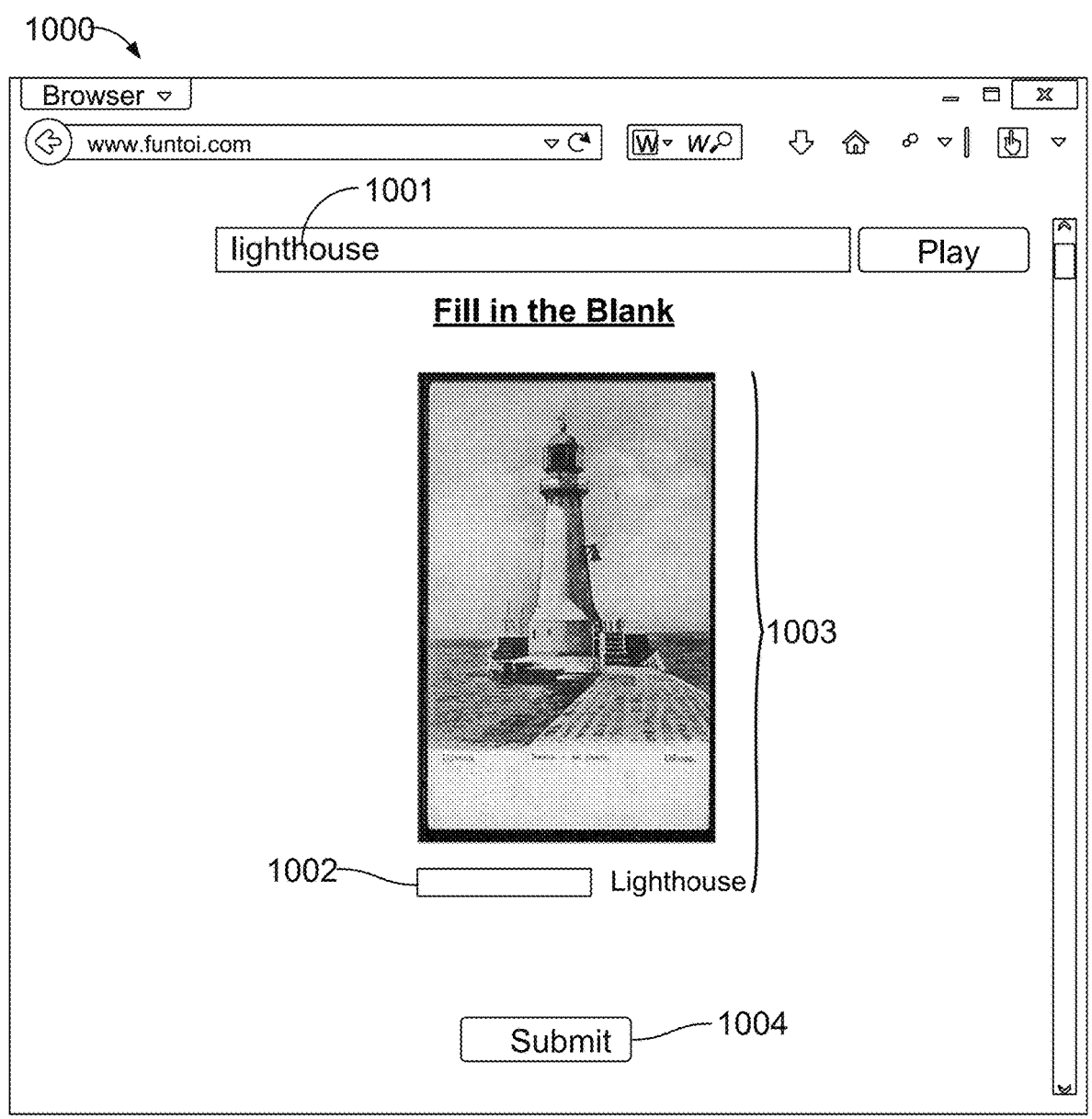
FIG. 10 illustrates another exemplary fill in the blank question presented to the user by the gaming computing device of FIG. 1.

FIG. 10 depicts an exemplary game page 1000 comprising of a fill in the blank question in accordance with an embodiment of the present disclosure. Assume that the search engine logic 111 (FIG. 1) identified the document 900 (FIG. 9) in response to the user search keywords 1001. The game logic 112 (FIG. 1) dynamically creates the question 1003 from the image section 903 (FIG. 9) of the document 900 (FIG. 9) by removing the phrase "Old Vorontsov" 905 (FIG. 9). Note that the question 1003 comprises of the image 904 (FIG. 9). To score points, the user has to fill in the missing text in the input box 1002 and submit the response to the game logic 112 (FIG. 1) by selecting control 1004. Once the user fills in the input box 1002 and submits the response, the game logic 112 (FIG. 1) compares the user's response with the text 905 (FIG. 9) from the section 903 (FIG. 9) and determines if the user response is correct or not and may award points to the user.

Figure 11:
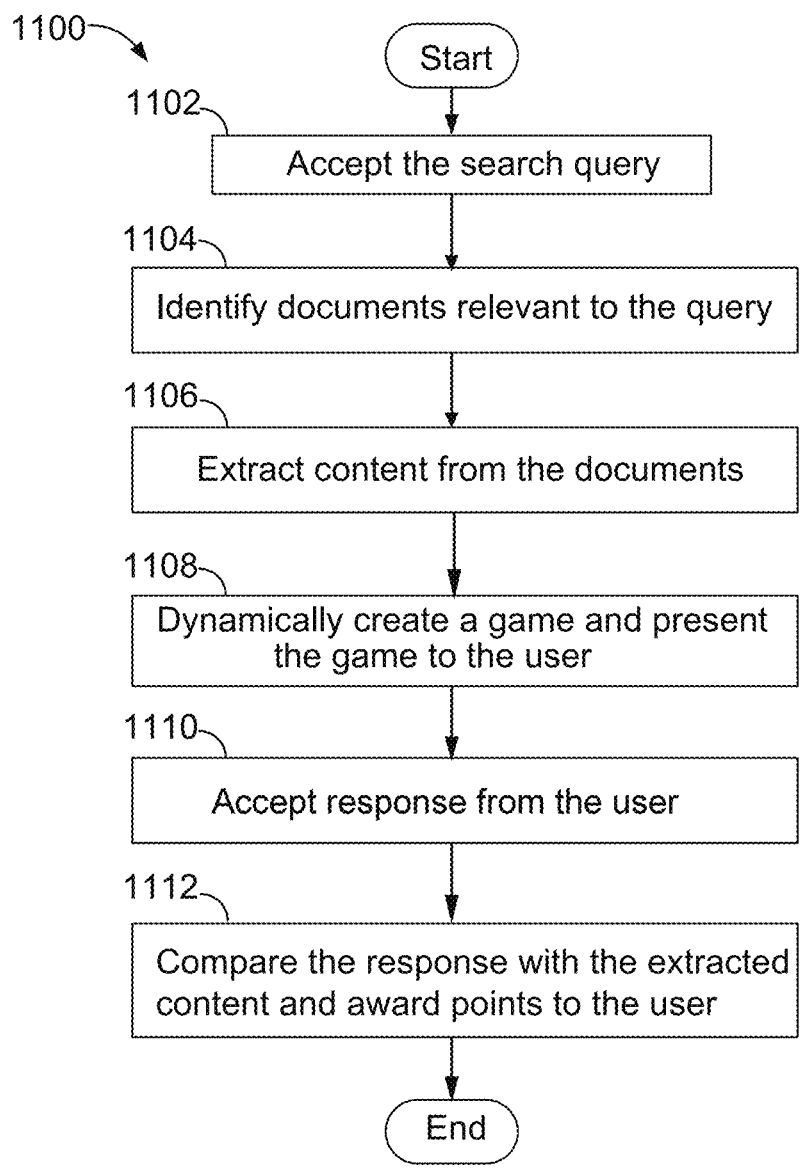
FIG. 11 is a flow diagram of a method of playing games making use of a search engine in accordance with one or more embodiments.

FIG. 11 is a flow chart illustrating one method in accordance with the present disclosure. In step 1102, the game computing unit 110 (FIG. 1) may accept the search query comprising of keyword(s)/search term(s). In step 1104, the game computing unit 110 (FIG. 1) may find the relevant search results for the search query. In step 1106, the game computing unit 110 (FIG. 1) may extract content from one or more relevant document(s). In step 1108, a game is created from the extracted content and presented to the user. In step 1110, the game computing unit 110 (FIG. 1) receives user response to the game question. In step 1112, the user response is compared with the extracted content and points are awarded to the user in step 1114.

The claimed subject matter has been provided here with reference to one or more features or embodiments. Those skilled in the art will recognize and appreciate that, despite of the detailed nature of the exemplary embodiments provided here, changes and modifications may be applied to said embodiments without limiting or departing from the generally intended scope. These and various other adaptations and combinations of the embodiments provided here are within the scope of the disclosed subject matter as defined by the claims and their full set of equivalents.

What is claimed is:

1. A method executable on a computing device comprising a processor, memory and a storage unit to create dynamic question and answer game on at least one data source comprising document(s), said method comprising: (a) receiving keyword(s) from a user; (b) generating search result(s) by identifying document(s) comprising the keyword(s) in response to the keyword(s) from the user; (c) selecting the document from at least one search result; (d) selecting a type of game; (e) dynamically creating a question of the type from within content of the document wherein an answer to the question is within the content of the document and the answer is different from the keyword(s); (f) presenting the question to the user; (g) accepting a response from the user; (h) displaying or comparing the response with the answer; and (i) optionally providing a score to the user.

2. The method as in claim 1, wherein the type of game is selected from a group consisting of fill in the blanks, rearranging words, true/false and combinations thereof.

3. The method as in claim 1, wherein the type of game is selected by the user.

4. The method as in claim 1, wherein the game is restricted to the content in a visual element of the document.

5. The method as in claim 4, wherein the visual element may be selected from a group consisting of paragraph, table, list, menu, fixed width text, key/value, graph/chart, question/answer, timeline, image, and interactive data.

6. The method of claim 4, wherein the visual element is selected by the user.

7. The method as in claim 1, wherein a level of difficulty of the question is selected by the user.

8. The method as in claim 7, wherein the user score is calculated based on the level of difficulty of the question.

9. The method as in claim 1, wherein the question is created in such a way that the response is a verb or a noun.

10. The method as in claim 1, wherein the question is created in such a way that the response is a parts of speech.

11. The method as in claim 1, wherein the user score is calculated based on proximity of the response to the answer.

12. The method as in claim 1, wherein the user score is calculated based on exact matching of the response with the answer.

13. The method as in claim 1, wherein the user score is calculated based on time taken by the user in responding to the question.

14. The method as in claim 1, further comprises maintaining a user history.

15. The method as in claim 14, wherein a level of difficulty of the questions for the user is based on the user history.

16. The method as in claim 1, wherein an identifier to the document comprising the question is included when presenting the question to the user.

17. The method as in claim 1, wherein the title of the section in the document comprising the question is included when presenting the question to the user.

18. The method as in claim 1, wherein the content surrounding the question in the document is included when presenting the question to the user.

* * * * *